Patented July 25, 1944

2,354,505

UNITED STATES PATENT OFFICE 2,354,505

DIAZINE DERIVATIVES

Gaetano F. D'Alelio and James W. Underwood, Pittsfield, Mass., assignors to General Electric Company, a corporation of New York No Drawing. Application June 30, 1942,
Serial No. 449,167

20 Claims. (Cl. 260—251)

This invention relates to new chemical compounds and more particularly to diazine derivatives. The invention especially is concerned with the production of new and useful ketonic-substituted thio diazines.

The chemical compounds of this invention may be represented by the following general formula:

I

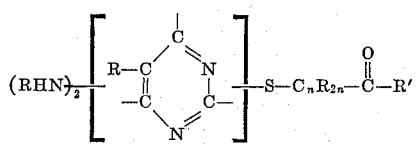

In the above formula $n$ represents an integer and is at least 1 and not more than 2, R represents a member of the class consisting of hydrogen and monovalent hydrocarbon and substituted hydrocarbon radicals, more particularly halo-hydrocarbon radicals, and R' represents a member of the class consisting of monovalent aliphatic hydrocarbon radicals and monovalent aromatic and nuclearly substituted, specifically halogenated, aromatic hydrocarbon radicals.

Illustrative examples of radicals that R in the above formula may represent are: aliphatic (e. g., methyl, ethyl, propyl, isopropyl, butyl, secondary butyl, isobutyl, butenyl, amyl, isoamyl, hexyl, octyl, allyl, methallyl, ethallyl, crotyl, etc.), including cycloaliphatic (e. g., cyclopentyl, cyclopentenyl, cyclohexyl, cyclohexenyl, cycloheptyl, etc.); aryl (e. g., phenyl, diphenyl or xenyl, naphthyl, etc.); aliphatic-substituted aryl (e. g., tolyl, xylyl, ethylphenyl, propylphenyl, isopropylphenyl, allylphenyl, 2-butenylphenyl, tertiary-butylphenyl, etc.); aryl-substituted aliphatic (e. g., benzyl, cinnamyl, phenylethyl, phenylpropyl, etc.); and their homologues, as well as those groups with one or more of their hydrogen atoms substituted by, for example, a halogen, more particularly chlorine, bromine, fluorine or iodine. Specific examples of halogeno-substituted hydrocarbon radicals that R in the above formula may represent are: chloromethyl, chloroethyl, chlorophenyl, dichlorophenyl, ethyl chlorophenyl, chlorocyclohexyl, phenyl chloroethyl, bromoethyl, bromopropyl, fluorophenyl, iodophenyl, bromotolyl, etc.

Illustrative examples of monovalent aliphatic and aromatic hydrocarbon radicals that R' in the above formula may represent are: methyl, ethyl, propyl, isopropyl, butyl, secondary butyl, isobutyl, butenyl, amyl, isoamyl, hexyl, octyl, allyl, methallyl, ethallyl, crotyl, cyclopentyl, cyclopentenyl, cyclohexyl, cyclohexenyl, cycloheptyl, benzyl, cinnamyl, phenylethyl, phenylpropyl, phenyl, diphenyl, naphthyl, anthracyl, tolyl, xylyl, ethylphenyl, propylphenyl, isopropylphenyl, allylphenyl, propenylphenyl, 2-butenylphenyl, tertiary-butylphenyl, methylnaphthyl and the like.

Illustrative examples of monovalent, nuclearly substituted, specifically nuclearly halogenated, aromatic hydrocarbon radicals that R' may represent are: chlorophenyl, dichlorophenyl, bromophenyl, dibromophenyl, iodophenyl, fluorophenyl, chlorotolyl, bromotolyl, chloroxylyl, chloronaphthyl, dichloronaphthyl, chloroxenyl, dichloroxenyl, bromoxenyl and the like.

Preferably R in Formula I is hydrogen. However, there also may be produced in accordance with the present invention compounds such, for instance, as those represented by the general formulas:

II

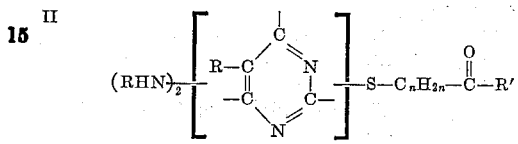

and, more particularly,

III

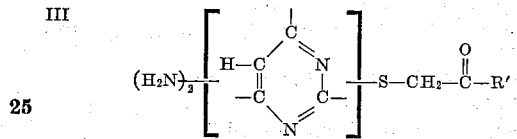

and

IV

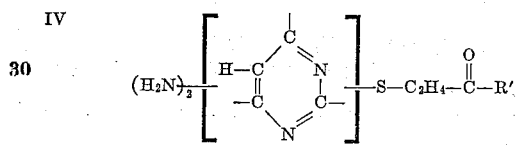

where $n$, R and R' have the same meanings as given above with reference to Formula I.

The new compounds of this invention may be used, for example, as pharmaceuticals, plasticizers and as intermediates in the preparation of derivatives thereof such as hydrazo, hydrazino, carbazido, semicarbazido, ureido, amidine, methylol, etc., derivatives of the individual compound embraced by Formula I. These new compounds are especially valuable in the preparation of synthetic resinous compositions. Thus, they may be condensed with, for instance, aldehydes, including polymeric aldehydes, hydroxyaldehydes and aldehyde-addition products, to yield condensation products of particular utility in the plastics and coating arts. Such condensation products are more fully described and are specifically claimed in our copending application Serial No. 449,166, filed concurrently herewith and assigned to the same assignee as the present invention. These new compounds also may be compounded with rubber, both natural and synthetic, to modify the properties of the rubber.

Various methods may be employed to produce the chemical compounds of this invention. We prefer to prepare them by effecting reaction, in the presence of a hydrohalide acceptor, between a mercapto (monomercapto) diamino pyrimidine and a halogenated ketone corresponding to the formula

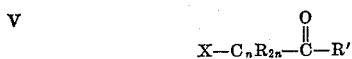

where X represents a halogen atom and $n$, R and R' have the same meanings as given above with reference to Formula I.

Illustrative examples of mercapto diamino [(—NHR)$_2$] pyrimidines that may be employed, depending upon the particular end-product sought, are:

2-mercapto 4,6-diamino pyrimidine
4-mercapto 2,6-diamino pyrimidine (6-mercapto 2,4-diamino pyrimidine)
2-mercapto 4,6-diamino 5-methyl pyrimidine
4-mercapto 2,6-diamino 5-ethyl pyrimidine
2-mercapto 4,6-diamino 5-phenyl pyrimidine
2-mercapto 4-bromotoluido 6-benzylamino pyrimidine
2-toluido 4-mercapto 6-methylamino pyrimidine
2-mercapto 4-phenylchloroethylamino 6-phenethylamino pyrimidine
2-mercapto 4-chloroanilino 6-ethylphenylamino pyrimidine
2-mercapto 4-cycloheptylamino 6-isopropylamino pyrimidine
2-mercapto 4,6-di-(methylamino) pyrimidine
2-mercapto 4,6-di-(ethylamino) 5-fluorophenyl pyrimidine
2-mercapto 4,6-di-(fluorophenylamino) pyrimidine
2-mercapto 4-methylamino 6-amino pyrimidine
2-mercapto 4-propenylamino 6-amino pyrimidine
2-mercapto 4,6-di-(benzylamino) 5-methyl pyrimidine
2-mercapto 4,6-di-(cyclopentylamino) 5-ethyl pyrimidine
2-mercapto 4,6-dianilino pyrimidine
2-mercapto 4,6-ditoluido 5-iodophenyl pyrimidine
2-mercapto 4,6-dixylidino pyrimidine
2-mercapto 4,6-di-(phenethylamino) 5-butyl pyrimidine
2-mercapto 4,6-di-(ethylphenylamino) 5-tolyl pyrimidine
4-mercapto 2,6-di-(methylamino) 5-methyl pyrimidine
2-mercapto 4,6-di-(chloroethylamino) pyrimidine
2-mercapto 4,6-di-(bromoxylidino) 5-chloroethyl pyrimidine
2-mercapto 4,6-diamino 5-bromotolyl pyrimidine
2-mercapto 4,6-di-(iodophenylamino) pyrimidine
2-mercapto 4-allylamino 6-butylamino pyrimidine
4-mercapto 2,6-di-(methylamino) pyrimidine
2-mercapto 4,6-di-(methylamino) 5-methyl pyrimidine
4-mercapto 2,6-di-(methylamino) 5-phenyl pyrimidine
2-mercapto 4-chloroethylamino 6-methylamino pyrimidine
2-mercapto 4,6-dianilino 5-butyl pyrimidine
2-mercapto 4-xenylamino 5-cyclohexenyl 6-amino pyrimidine
2-mercapto 4-xenylamino 5-cyclopentyl 6-amino pyrimidine
2-toluido 4-mercapto 5-cyclohexenyl 6-amino pyrimidine
2-mercapto 4,6-di-(propylamino) pyrimidine
2-allylamino 4-mercapto 6-chlorophenylamino pyrimidine
2-pentylamino 4-mercapto 5-phenyl 6-amino pyrimidine
2-dichloroanilino 4-mercapto 5-tolyl 6-propylamino pyrimidine
2-cycloheptylamino 4-mercapto 6-butylamino pyrimidine
2-mercapto 4-(3'-butylamino) 6-isopropylamino pyrimidine
2-mercapto 4-amino 5-phenylpropyl 6-chlorocyclohexylamino pyrimidine
2-mercapto 4-amino 6-chlorohexenylamino pyrimidine
2-mercapto 4,6-diamino 5-bromotolyl pyrimidine Illustrative examples of halogenated ketones that may be used, depending upon the desired end-product, are:

Chloromethyl methyl ketone
Chloromethyl phenyl ketone
Alpha-chloroethyl methyl ketone
Beta-chloroethyl ethyl ketone
Bromomethyl phenyl ketone
Iodomethyl phenyl ketone
Bromomethyl methyl ketone
Iodomethyl methyl ketone
Chloromethyl ethyl ketone
Beta-chloroethyl methyl ketone
Alpha-chloroethyl ethyl ketone
Chloromethyl propyl ketone
Chloromethyl vinyl ketone
Chloromethyl tolyl ketones
Bromomethyl tolyl ketones
Iodomethyl tolyl ketones
Chloromethyl xylyl ketones
Chloromethyl naphthyl ketone
Beta-bromoethyl cyclopentyl ketone
Bromomethyl xylyl ketones
Bromomethyl naphthyl ketone
Chloromethyl propenylphenyl ketones
Chloromethyl para-chloroxenyl ketone
Alpha-chloroethyl phenyl ketone
Beta-chloroethyl phenyl ketone
Alpha-bromoethyl phenyl ketone
Beta-bromoethyl phenyl ketone
Alpha-chloroethyl tolyl ketones
Alpha-bromoethyl tolyl ketones
Beta-chloroethyl tolyl ketones
Beta-bromoethyl tolyl ketones
Chloromethyl chlorophenyl ketones
Chloromethyl chlorotolyl ketones
Alpha-chloroethyl chlorophenyl ketones
Beta-chloroethyl fluorophenyl ketones
Alpha-iodoethyl fluorophenyl ketones
Bromomethyl bromophenyl ketones
Alpha-chloroethyl ethylphenyl ketones
Beta-bromoethyl ethylphenyl ketones
Alpha-bromoethyl bromophenyl ketones
Alpha-iodoethyl iodophenyl ketones
(Alpha-chloro beta-phenyl ethyl) phenyl ketone
(Beta-bromo alpha-ethyl ethyl) tolyl ketones
(Alpha - iodophenyl beta - propyl beta - chloro ethyl) phenyl ketone
(Alpha-chloro beta-phenyl ethyl) methyl ketone
Chloromethyl cyclohexenyl ketone
(Beta-bromo alpha-ethyl ethyl) ethyl ketone
(Alpha-iodophenyl beta-propyl beta-chloro ethyl) (alpha'-phenyl ethyl) ketone
(Alpha-bromo beta-butyl ethyl) butyl ketone
(Beta-chloro alpha-phenyl ethyl) pentyl ketone
(Alpha-bromo beta-phenyl ethyl) hexyl ketone Various hydrohalide acceptors may be employed. We prefer to use a hydrohalide acceptor that will react with the mercapto pyrimidine to form a water-soluble salt. Examples of The (diamino pyrimidyl thio methyl) aromatic ketones
The (diamino pyrimidyl thio methyl) nuclearly halogenated aromatic ketones
The alpha-(diamino pyrimidyl thio ethyl) aliphatic ketones
The alpha-(diamino pyrimidyl thio ethyl) aromatic ketones
The alpha-(diamino pyrimidyl thio ethyl) nuclearly halogenated aromatic ketones
The beta-(diamino pyrimidyl thio ethyl) aliphatic ketones
The beta-(diamino pyrimidyl thio ethyl) aromatic ketones
The beta-(diamino pyrimidyl thio ethyl) nuclearly halogenated aromatic ketones
(4,6-diamino 5-methyl pyrimidyl-2 thio methyl) methyl ketone
[4,6-di-(methylamino) pyrimidyl-2 thio methyl] methyl ketone
[4,6-di-(isobutylamino) pyrimidyl-2 thio methyl] methyl ketone
[4,6-di-(propenylamino) pyrimidyl-2 thio methyl] ethyl ketone
(4,6-dianilino pyrimidyl-2 thio methyl) ethyl ketone
[4,6-di-(methylamino) pyrimidyl-2 thio methyl] propyl ketone
(4,6-dianilino pyrimidyl-2 thio methyl) propenyl ketone
(4,6-ditoluido pyrimidyl-2 thio methyl) phenethyl ketone
(4,6-dixylidino pyrimidyl-2 thio methyl) phenyl ketone
[4,6-di-(naphthylamino) pyrimidyl-2 thio methyl] phenyl ketone
[2,6-di-(methylamino) 5-methyl pyrimidyl-4 thio ethyl] methyl ketones
[4,6-di-(phenethylamino) 5-tolyl pyrimidyl-2 thio ethyl] vinyl ketones
[Beta-(4,6-dianilino 5-methyl pyrimidyl-2 thio) ethyl] methyl ketone
[Alpha-fluorophenyl beta-(4,6-diamino pyrimidyl-2 thio) ethyl] ethyl ketone
[Beta-(4-methylamino 5-methyl 6-amino pyrimidyl-2 thio) ethyl] phenyl ketone
[4,6-di-(methylamino) pyrimidyl-2 thio methyl] tolyl ketones
[2,6-di-(ethylamino) pyrimidyl-4 thio methyl] phenyl ketone
[4,6-di-(butylamino) pyrimidyl-2 thio methyl] phenyl ketone
[2,6-di-(propenylamino) pyrimidyl-4 thio methyl] phenyl ketone
[4,6-di-(cyclopentylamino) pyrimidyl-2 thio methyl] phenyl ketone
(4,6-dianilino pyrimidyl-2 thio methyl) phenyl ketone
(4,6-ditoluido pyrimidyl-2 thio methyl) chlorophenyl ketones
[4,6-di-(naphthylamino) pyrimidyl-2 thio methyl] bromotolyl ketones
[2,6-di-(chloroethylamino) pyrimidyl-4 thio methyl] iodophenyl ketones
(4,6-diamino pyrimidyl-2 thio methyl) xylyl ketones
(2,6-diamino pyrimidyl-4 thio methyl) ethylphenyl ketones
(4,6-diamino pyrimidyl-2 thio methyl) propenylphenyl ketones
(4,6-dianilino pyrimidyl-2 thio methyl) xenyl ketone
[4,6-di-(methylamino) pyrimidyl-2 thio methyl] propylphenyl ketones
[Alpha-propyl beta-(4-anilino 5-iodophenyl 6-amino pyrimidyl-2 thio) ethyl] benzyl ketone
[Beta-(4-anilino 5-propyl 6-methylamino pyrimidyl-2 thio) ethyl] cyclopentyl ketone
[Alpha-(4,6-diamino 5-chloroethyl pyrimidyl-2 thio) butyl] tolyl ketones
[4,6-di-(methylamino) 5-methyl pyrimidyl-2 thio methyl] methyl ketone
(4,6-dianilino 5-methyl pyrimidyl-2 thio methyl) methyl ketone
[4,6-di-(bromoanilino) 5-methyl pyrimidyl-2 thio methyl] phenyl ketone
[4,6-di-(cyclopentylamino) pyrimidyl-2 thio methyl] ethylphenyl ketones
[Beta-(4,6-diamino pyrimidyl-2 thio) ethyl] phenyl ketone
[Alpha-(2,6-diamino pyrimidyl-4 thio) ethyl] phenyl ketone
[Alpha-(4,6-diamino 5-methyl pyrimidyl-2 thio) ethyl] phenyl ketone
[Beta-(2,6-diamino pyrimidyl-4 thio) ethyl] phenyl ketone
(Diamino pyrimidyl thio methyl) chlorophenyl ketones
(Diamino pyrimidyl thio methyl) bromophenyl ketones
(Diamino pyrimidyl thio methyl) iodophenyl ketones
(Diamino pyrimidyl thio methyl) fluorophenyl ketones
[Alpha-(4,6-diamino pyrimidyl-2 thio) ethyl] tolyl ketones
[Beta-(2,6-diamino 5-chlorotolyl pyrimidyl-2 thio) ethyl] chlorotolyl ketones
(Diamino pyrimidyl thio ethyl) naphthyl ketones
(Diamino pyrimidyl thio ethyl) anthracyl ketones
[Alpha-ethyl beta-(4,6-diamino pyrimidyl-2 thio) ethyl] phenyl ketone
[Beta-phenyl alpha-(4,6-diamino 5-phenyl pyrimidyl-2 thio) ethyl] tolyl ketones
(Diamino pyrimidyl thio methyl) heptyl ketones
(Diamino pyrimidyl thio ethyl) octyl ketones It will be understood, of course, by those skilled in the art that, in those compounds listed above that are generically named, the amino (—NHR) groups and the ketonic-substituted thio groups may be attached in any arrangement to the symmetrical carbon atoms of the pyrimidine nucleus. In other words, the term "diamino pyrimidyl" includes within its meaning both the 4,6-diamino pyrimidyl-2 and the 2,6-diamino pyrimidyl-4 (2,4-diamino pyrimidyl-6) compounds.

In a manner similar to that described above with particular reference to the diamino $$[(-NHR)_2]$$

ketonic-substituted pyrimidines (1,3- or meta-diazines), corresponding derivatives of the 1,2- or ortho-diazines (pyridazines) and of the 1,4- or para-diazines (pyrazines) may be prepared. It also will be understood by those skilled in the art from the foregoing description of the preparation of a mono-thio diazine derivative that similar compounds may be prepared in which two or three sulfur atoms are attached directly to a carbon atom of the diazine nucleus and which have attached to each sulfur atom a $$-C_nR_{2n}-COR'$$

grouping, where $n$, R and R' have the same meanings as given above with reference to Formula I.

such acceptors are the alkali-metal hydroxides, e. g., sodium hydroxide, potassium hydroxide, etc. Additional examples of hydrohalide acceptors that may be used are other inorganic bases, e. g., calcium hydroxide, barium hydroxide, ammonium hydroxide, etc.; carbonates of inorganic bases, including the carbonates of alkali metals; organic amines such as tertiary amines, e. g., trimethyl amine, triethyl amine, tributyl amine, pyridine, dimethyl aniline, quinoline, etc.; quaternary ammonium bases, e. g., tetramethyl ammonium hydroxide, etc.; and the like.

The reaction between the mercapto diamino pyrimidine and the chosen halogenated ketone may be carried out in any suitable manner, but preferably is effected in the presence of a suitable solvent or mixture of solvents. Although various solvents and solvent mixtures may be employed, for economic reasons and because of their eminent suitability we prefer to use water or a mixture of water and alcohol. Instead of alcohol, other solvents may be employed, for instance dioxane. The reaction may be carried out under a variety of temperature and pressure conditions, for instance at normal, sub-normal or at elevated temperatures and at atmospheric, sub-atmospheric or super-atmospheric pressures.

The above reaction may be represented by the following general equation:

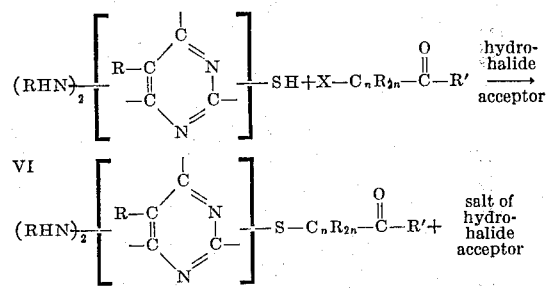

In the above equation X represents a halogen atom and $n$, R and R' have the same meanings as given above with reference to Formula I.

In order that those skilled in the art better may understand how the present invention may be carried into effect, the following illustrative examples are given. All parts are by weight.

*Example 1*

This example illustrates the preparation of (4,6,-diamino pyrimidyl-2 thio methyl) phenyl ketone, the formula for which is

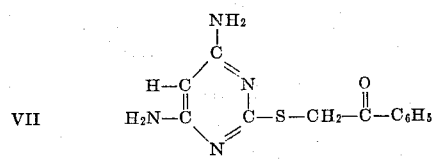

| | Parts |
|---|---|
| 2-mercapto 4,6-diamino pyrimidine | 142.0 |
| Phenacyl chloride | 154.5 |
| Sodium hydroxide | 40.0 |
| Water | 500.0 |
| Alcohol | 500.0 |

The above-stated amounts of 2-mercapto 4,6-diamino pyrimidine and sodium hydroxide were dissolved in the mixture of the stated amounts of alcohol and water, yielding a clear solution. The phenacyl chloride was added to this solution. The mix was stirred and allowed to react at room temperature for 24 hours, followed by heating under reflux at the boiling temperature of the mass for 1 hour. After cooling, the precipitate comprising (4,6-diamino pyrimidyl-2 thio methyl) phenyl ketone was filtered off, washed and dried. A yield of 242 parts of washed and dried product was obtained. No attempt was made to obtain any more product from the mother liquor.

*Example 2*

The compound (2,6-diamino pyrimidyl-4 thio methyl), phenyl ketone, is prepared in essentially the same manner as described under Example 1 with the exception that 142 parts of 4-mercapto 2,6-diamino pyrimidine are used in place of 142 parts of 2-mercapto 4,6-diamino pyrimidine.

*Example 3*

| | Parts |
|---|---|
| 2-mercapto 4,6-diamino pyrimidine | 142 |
| Para-chlorophenyl phenacyl bromide | 309 |
| Sodium hydroxide | 40 |
| Water | 2000 |
| Alcohol | 2000 |

The same procedure was followed as described under Example 1. A precipitate comprising (4,6-diamino pyrimidyl-2 thio methyl) para-chloroxenyl ketone was filtered off, washed and dried. A yield of 350 parts of washed and dried product was obtained. No attempt was made to obtain any more product from the mother liquor.

*Example 4*

The compound, [4,6-di-(methylamino) pyrimidyl-2 thio methyl] phenyl ketone, is produced in essentially the same manner as described under Example 1 with the exception that, instead of 2-mercapto 4,6-diamino pyrimidine, an equivalent amount of 2-mercapto 4,6-di-(methylamino) pyrimidine is employed.

*Example 5*

The compound, [4,6-di-(ethylamino) pyrimidyl-2 thio methyl] para-chloroxenyl ketone, is produced in essentially the same manner as described under Example 3 with the exception that, instead of 2-mercapto 4,6-diamino pyrimidine, an equivalent amount of 2-mercapto 4,6-di-(ethylamino) pyrimidine is used.

*Example 6*

| | Parts |
|---|---|
| 2-mercapto 4,6-diamino pyrimidine | 142.0 |
| Monochloroacetone | 92.5 |
| Sodium hydroxide in 60 parts water | 40.0 |

The same procedure was followed as described under Example 1. A precipitate comprising (4,6-diamino pyrimidyl-2 thio methyl) methyl ketone was filtered off, washed and dried. A yield of 157 parts of washed and dried product was obtained. No attempt was made to obtain any more product from the mother liquor.

*Example 7*

The compound, [alpha-(4,6-diamino pyrimidyl-2 thio) ethyl] phenyl ketone, is prepared in essentially the same manner as described under Example 1 with the exception that, instead of phenacyl chloride, an equivalent amount of alpha-chlorethyl phenyl ketone is used.

Other examples of the chemical compounds of this invention are listed below:

The (diamino pyrimidyl thio methyl) aliphatic (e. g., alkyl, alkenyl) ketones, including the (4,6-diamino pyrimidyl-2 thio methyl) aliphatic ketones and the (2,6-diamino pyrimidyl-4 thio methyl) aliphatic ketones

What we claim as new and desire to secure by Letters Patent of the United States is:

1. Chemical compounds corresponding to the general formula

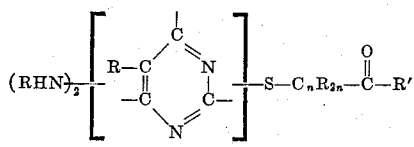

where $n$ represents an integer and is at least 1 and not more than 2, R represents a member of the class consisting of hydrogen and monovalent hydrocarbon and halo-hydrocarbon radicals, and R' represents a member of the class consisting of monovalent aliphatic hydrocarbon radicals and monovalent aromatic and nuclearly halogenated aromatic hydrocarbon radicals.

2. Chemical compounds as in claim 1 wherein R represents a hydrogen atom.

3. Chemical compounds as in claim 1 wherein R represents a hydrogen atom and R' represents a monovalent aliphatic hydrocarbon radical.

4. Chemical compounds as in claim 1 wherein R represents a hydrogen atom and R' represents a monovalent aromatic hydrocarbon radical.

5. Chemical compounds as in claim 1 wherein R represents a hydrogen atom and R' represents a monovalent, nuclearly halogenated aromatic hydrocarbon radical.

6. Chemical compounds corresponding to the general formula

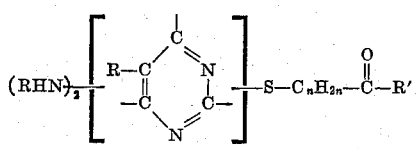

where $n$ represents an integer and is at least 1 and not more than 2, R represents a member of the class consisting of hydrogen and monovalent hydrocarbon and halo-hydrocarbon radicals, and R' represents a member of the class consisting of monovalent aliphatic hydrocarbon radicals and monovalent aromatic and nuclearly halogenated aromatic hydrocarbon radicals.

7. Chemical compounds corresponding to the general formula

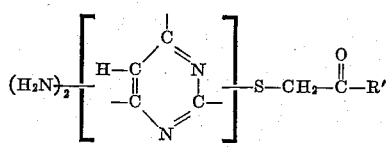

where R' represents a member of the class consisting of monovalent aliphatic hydrocarbon radicals and monovalent aromatic and nuclearly halogenated aromatic hydrocarbon radicals.

8. A (diamino pyrimidyl thio methyl) aliphatic ketone.

9. A (diamino pyrimidyl thio methyl) alkyl ketone.

10. (4,6-diamino pyrimidyl-2 thio methyl) methyl ketone.

11. (A (diamino pyrimidyl thio methyl) aromatic ketone.

12. A (diamino pyrimidyl thio methyl) phenyl ketone.

13. (4,6-diamino pyrimidyl-2 thio methyl) phenyl ketone.

14. A (diamino pyrimidyl thio methyl) nuclearly halogenated aromatic ketone.

15. A (diamino pyrimidyl thio methyl) nuclearly chlorinated aromatic ketone.

16. (4,6-diamino pyrimidyl-2 thio methyl) para-chloroxenyl ketone.

17. The method of preparing chemical compounds corresponding to the general formula

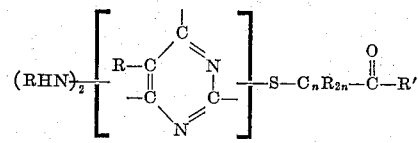

where $n$ represents an integer and is at least 1 and not more than 2, R represents a member of the class consisting of hydrogen and monovalent hydrocarbon and halo-hydrocarbon radicals, and R' represents a member of the class consisting of monovalent aliphatic hydrocarbon radicals and monovalent aromatic and nuclearly halogenated aromatic hydrocarbon radicals, said method comprising effecting reaction, in the presence of a hydrohalide acceptor, between (1) a mercapto diazine corresponding to the general formula

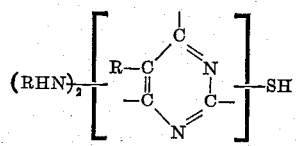

where R has the meaning above given, and (2) a halogenated ketone corresponding to the general formula

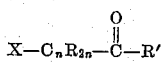

where X represents a halogen atom, and $n$, R and R' have the meanings above given.

18. A method as in claim 17 wherein the hydrohalide acceptor is an alkali-metal hydroxide.

19. The method of preparing (4,6-diamino pyrimidyl-2 thio methyl) phenyl ketone which comprises effecting reaction, in the presence of an alkali-metal hydroxide, between 2-mercapto 4,6-diamino pyrimidine and phenacyl chloride.

20. The method of preparing (4,6-diamino pyrimidyl-2 thio methyl) methyl ketone which comprises effecting reaction, in the presence of an alkali-metal hydroxide, between 2-mercapto 4,6-diamino pyrimidine and monochloroacetone.

GAETANO F. D'ALELIO.
JAMES W. UNDERWOOD.

CERTIFICATE OF CORRECTION.

Patent No. 2,354,505. July 25, 1944.

GAETANO F. D'ALELIO, ET AL.

It is hereby certified that error appears in the printed specification of the above numbered patent requiring correction as follows: Page 2, second column, line 7, for "butylamino" read --butenylamino--; page 3, second column, line 10, strike out the comma after "methyl)" and insert the same after "compound" in line 9; line 68, for "chlorethyl" read --chloroethyl--; page 5, second column, line 3, before "A" strike out the opening parenthesis; and that the said Letters Patent should be read with this correction therein that the same may conform to the record of the case in the Patent Office.

Signed and sealed this 3rd day of October, A. D. 1944.

Leslie Frazer

(Seal)                               Acting Commissioner of Patents.